United States Patent
Kotlyar

(10) Patent No.: US 9,810,255 B2
(45) Date of Patent: Nov. 7, 2017

(54) THREADED STANDOFF WITH ANTI-ROTATIONAL STRUCTURE

(71) Applicant: SCHNEIDER ELECTRIC IT CORPORATION, West Kingston, RI (US)

(72) Inventor: Edward Kotlyar, Needham, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 76 days.

(21) Appl. No.: 14/893,866

(22) PCT Filed: May 31, 2013

(86) PCT No.: PCT/US2013/043661
§ 371 (c)(1),
(2) Date: Nov. 24, 2015

(87) PCT Pub. No.: WO2014/193411
PCT Pub. Date: Dec. 4, 2014

(65) Prior Publication Data
US 2016/0131174 A1    May 12, 2016

(51) Int. Cl.
*F16B 37/00* (2006.01)
*F16B 39/282* (2006.01)
*F16B 33/00* (2006.01)
*F16B 37/14* (2006.01)
*F16B 9/02* (2006.01)

(52) U.S. Cl.
CPC .......... *F16B 33/002* (2013.01); *F16B 37/145* (2013.01); *F16B 39/282* (2013.01); *F16B 9/026* (2013.01)

(58) Field of Classification Search
CPC ........ F16B 9/026; F16B 37/00; F16B 33/002; F16B 39/282
USPC .......................................... 411/546, 389, 166
See application file for complete search history.

(56) References Cited

U.S. PATENT DOCUMENTS

| | | | | |
|---|---|---|---|---|
| 3,596,138 | A | * | 7/1971 | Lehrfeld ................ H01R 12/52 333/238 |
| 4,496,261 | A | * | 1/1985 | Cohen ...................... F16B 3/00 403/320 |
| 4,934,861 | A | * | 6/1990 | Weeks ................... B62D 21/09 403/167 |

(Continued)

OTHER PUBLICATIONS

Notification of Transmittal of the International Search Report and the Written Opinion of the International Searching Authority from corresponding PCT/US2013/043661 dated Oct. 8, 2013.

*Primary Examiner* — Flemming Saether
(74) *Attorney, Agent, or Firm* — Lando & Anastasi, LLP

(57) ABSTRACT

A standoff assembly for separating a first component from a second component from one another a predetermined distance includes a standoff having a predetermined length defined between a first end and a second end, and an anti-rotational structure formed at the first end. The anti-rotational structure is configured to be inserted into a corresponding opening formed in the first component. The standoff assembly further includes a first fastener to secure the first component to the first end of the standoff and a second fastener to secure the second component to the second end of the standoff. A method for separating a first component from a second component is further disclosed.

8 Claims, 4 Drawing Sheets

(56) References Cited

U.S. PATENT DOCUMENTS

| | | | | |
|---|---|---|---|---|
| 5,891,115 | A * | 4/1999 | Hauer | A63C 17/22 301/111.01 |
| 5,965,845 | A * | 10/1999 | Reiker | H02G 3/20 174/58 |
| 6,204,450 | B1 * | 3/2001 | Reiker | E04B 9/006 174/58 |
| 6,417,449 | B1 * | 7/2002 | Perez-Bonifacini | F16B 7/0433 174/54 |
| 6,842,343 | B2 * | 1/2005 | Lee | H05K 3/301 361/732 |
| 7,855,891 | B1 | 12/2010 | Ayres, III et al. | |
| 8,757,575 | B2 * | 6/2014 | Lin | H05K 7/142 248/346.03 |
| 9,419,421 | B1 * | 8/2016 | Valentine | H02G 3/14 |
| 9,476,440 | B2 * | 10/2016 | Hsu | F16B 5/02 |
| 2009/0257843 | A1 | 10/2009 | Bentrim | |
| 2010/0129174 | A1 | 5/2010 | Maloney | |

* cited by examiner

THREADED STANDOFF WITH ANTI-ROTATIONAL STRUCTURE

CROSS-REFERENCE TO RELATED APPLICATIONS

This application is a U.S. National Stage Application under 35 U.S.C. §371 of International Application No. PCT/US2013/043661, filed May 31, 2013, and entitled THREADED STANDOFF WITH ANTI-ROTATIONAL STRUCTURE, which is hereby incorporated herein by reference in its entirety.

BACKGROUND

1. Field of Disclosure

The present disclosure relates generally to the fastening systems, and more particularly to a threaded standoff with anti-rotational structure.

2. Discussion of Related Art

Threaded standoff assemblies are commonly used to mount one component, such as a printed circuit board, above another component, such as a substrate. Usually such standoff assemblies consist of multiple standoffs that are positioned between the components and fasteners that tie or otherwise secure the construction together. In other embodiments, spacers, which may include several pieces of tubing each enabling a bolt to pass through the spacer, may be employed to achieve a similar result. Each standoff functions as a threaded separator of defined length that is used to raise one assembly above another. In certain embodiments, the standoffs are usually round or hex (for wrench tightening), are often made of aluminum, brass, or nylon, and come in male-female or female-female configurations. In electronics, standoff assemblies are frequently used to raise a printed-circuit board above a surface of a substrate.

During assembly or disassembly, rotation of the standoff assembly must be prevented to assure that the screw or nut tightens properly on both ends of the standoff. The standoffs typically have flat ends that abut the components during assembly, and freely rotate when tightening the fasteners that are used to secure the assembly. It is possible to use tools to immobilize the standoff when all elements of the standoff assembly are accessible. However, in many instances, it is impossible to access either the standoff or one of the screws or nuts. Thus, the standoff rotates with the applied hardware, which results in the standoff assembly not being properly tightened together.

FIG. 1 shows a traditional standoff assembly generally indicated at 10, which is used to separate a first component 12 from a second component 14. The standoff assembly 10 includes a standoff 16 and first and second screws, each indicated at 18. In certain instances, the standoff 16 needs to be pre-assembled to one of components (e.g., component 14), with the partial assembly being placed inside an enclosure, which may prevent further access to bottom screw 18 and to the standoff during assembly of the other component (e.g., component 12).

SUMMARY OF DISCLOSURE

One aspect of the disclosure is directed to a standoff assembly for separating a first component from a second component from one another a predetermined distance. In one embodiment, the standoff assembly comprises a standoff including a predetermined length defined between a first end and a second end, and an anti-rotational structure formed at the first end, the anti-rotational structure being configured to be inserted into a corresponding opening formed in the first component. The standoff assembly further comprises a first fastener to secure the first component to the first end of the standoff and a second fastener to secure the second component to the second end of the standoff.

Embodiments of the standoff assembly further may include forming a threaded opening at each end of the standoff. The first fastener and the second fastener each may comprise a machine screw fastener. The anti-rotational structure may include a first protrusion formed on one side of the threaded opening. The anti-rotational structure further may include a second protrusion formed on an opposite side of the threaded opening. The standoff may be hexagonal in cross section along a length of the standoff. The opening in the first component may be shaped to receive the first protrusion. The opening in the first component may be shaped to receive the first protrusion and the second protrusion.

Another aspect of the disclosure is directed to a method for separating a first component from a second component. In one embodiment, the method comprises: positioning a standoff between the first component and the second component, the standoff including a predetermined length defined between a first end and a second end; securing the first component to the first end of the standoff with a first fastener and the second component to the second end of the standoff with a second fastener; and preventing a rotation of the standoff with an anti-rotational structure formed at the first end of the standoff and inserted into a corresponding opening formed in the first component.

Embodiments of the method further may include threadably securing a machine screw fastener within a threaded opening formed in the first end when securing the first component to the first end of the standoff with the first fastener. The method further may include threadably securing a machine screw fastener within a threaded opening formed in the second end when securing the second component to the second end of the standoff with the second fastener. Preventing the rotation of the standoff may include inserting the anti-rotational structure into a corresponding opening formed in the first component.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Embodiments of the present disclosure are directed standoff assemblies. The standoff assemblies may be used to separate one component, such as a printed circuit board, from another component, such as a substrate. In addition to providing the separation function, the standoff assemblies may be used to insulate one component from the other, thereby preventing electrical shorts between the components. In yet another embodiment, the standoff assemblies may be used to provide an electrical connection between two components, such as two printed circuit boards.

In a particular embodiment, a standoff assembly includes a standoff having an anti-rotational structure formed on one end of the standoff and a pair of fasteners that are used to secure each end of the standoff to respective components. The anti-rotational structure is configured to be inserted into a correspondingly shaped opening formed in one of the components. In a certain embodiment, the anti-rotational structure includes one or more protrusions that are formed on the end of the standoff. These protrusions are received in the correspondingly shaped opening formed in the component, and prevent the rotation of the standoff when securing the standoff to the two components.

Figure 1:
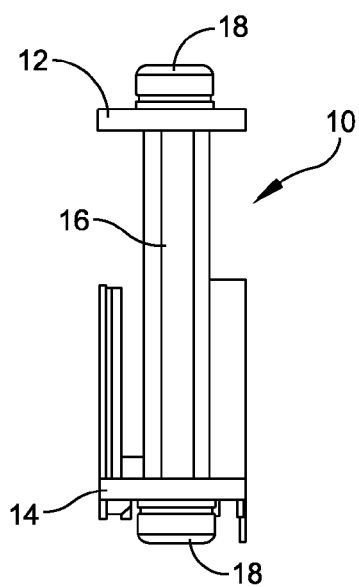
FIG. 1 is an elevational view of a prior art standoff assembly.
Figure 2:
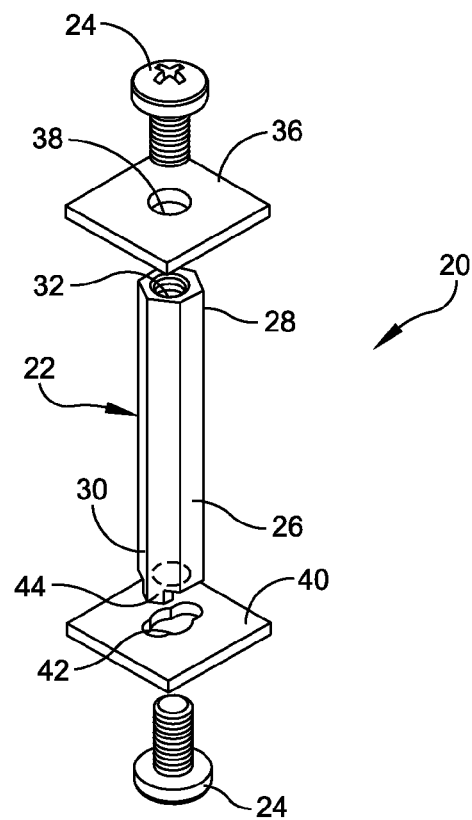
FIG. 2 is an exploded perspective view of a standoff assembly of an embodiment of the present disclosure that is used to separate a first component from a second component.
Figure 3:
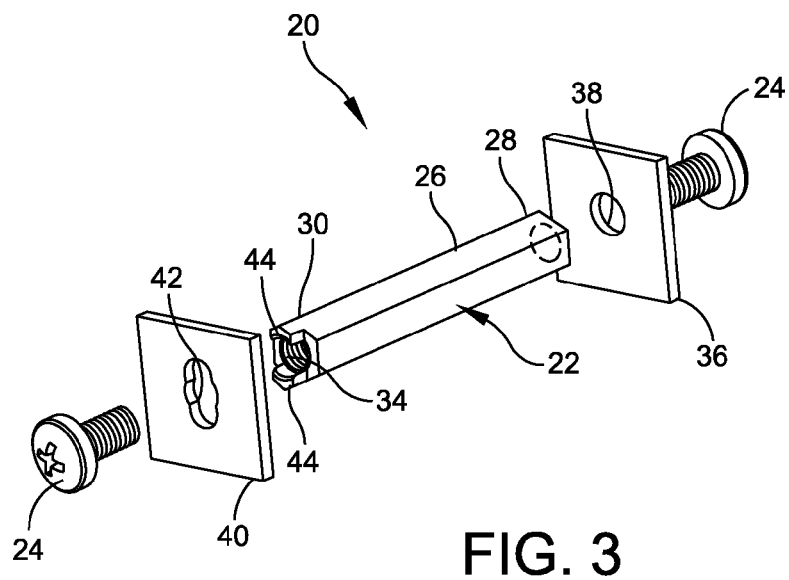
FIG. 3 is an exploded perspective view of the standoff assembly shown in FIG. 2 taken from a different perspective.

Referring to the drawings, and more particularly to FIGS. 2 and 3, a standoff assembly is generally indicated 20. As shown, the standoff assembly 20 includes an elongate standoff, generally indicated at 22, a first fastener and a second fastener, each indicated at 24. In one embodiment, the standoff 24 includes a hexagonal shape body 26 that is six millimeters ("mm") across flats and 39 mm in total length; however, other shapes and sizes may be selected based on the intended use of the standoff. The body 26 of the standoff has a first end 28 (an upper end illustrated in FIG. 2) and a second end 30 (a lower end illustrated in FIG. 2). In a certain embodiment, each end 28, 30 of the body 26 of the standoff 22 is formed with an opening 32, 34 threaded to receive a respective fastener 24. In one embodiment, each opening 32, 34 is a M4×0.7 eleven mm deep thread. The standoff 22 may be fabricated from any suitable metal, such as extruded brass material, or a hard dielectric material, such as plastic.

In one embodiment, the first and second fasteners 24 may be machine screw fasteners, which are each threaded to be threadably received within respective threaded openings 32, 34. The arrangement is that the first fastener 24 extends through a first component 36 having an opening 38 formed therein when threadably securing the first fastener to the threaded opening 32 of the first end 28 of the standoff in the manner described below. Similarly, the second fastener 24 extends through a second component 40 having an opening 42 formed therein when threadably securing the second fastener to the threaded opening 34 of the second end 30 of the standoff. The standoff assembly 20 separates the first component 36 from the second component 40 upon threadably securing the first and second fasteners 24 within their respective threaded openings 32, 34. Washers may be provided with the first and second fasteners 24 to distribute the load of the fasteners in the typical manner.

As shown, the second end 30 of the standoff 22 includes an anti-rotational structure that is formed on the body 26 of the standoff. In one embodiment, the anti-rotational structure includes two protrusions, each indicated at 44, which are provided on opposite sides of the threaded opening 34. In a certain embodiment, each protrusion 44 extends two mm from the end of the second end 30 of the body 26. The size and shapes of the two protrusions 44 may be selected based on the size of the standoff 22. It should be understood that the anti-rotational structure may alternatively be provided on the first end 28 of the body 26 of the standoff 22 or may be provided in additional to the anti-rotational structure provided on the second end 30. The two protrusions 44 are configured to be received within the opening 42 of the second component 40 to provide anti-rotational effect on the standoff 22 when assembling the standoff assembly 20 to the first and second components. In one embodiment, the two protrusions 44 are each two mm long, three mm wide, and symmetrically located at the second end 30 of the standoff 22 in such a way that the protrusions allow the passage of second fastener 24 into the threaded portion 34 of standoff. In certain embodiments, the anti-rotational structure may employ only one protrusion 44 instead of two protrusions, and the opening 42 may be formed to correspond to the shape of the protrusion, to prevent the rotation of the standoff 22 when assembling the standoff.

Figures 4A, 4B:
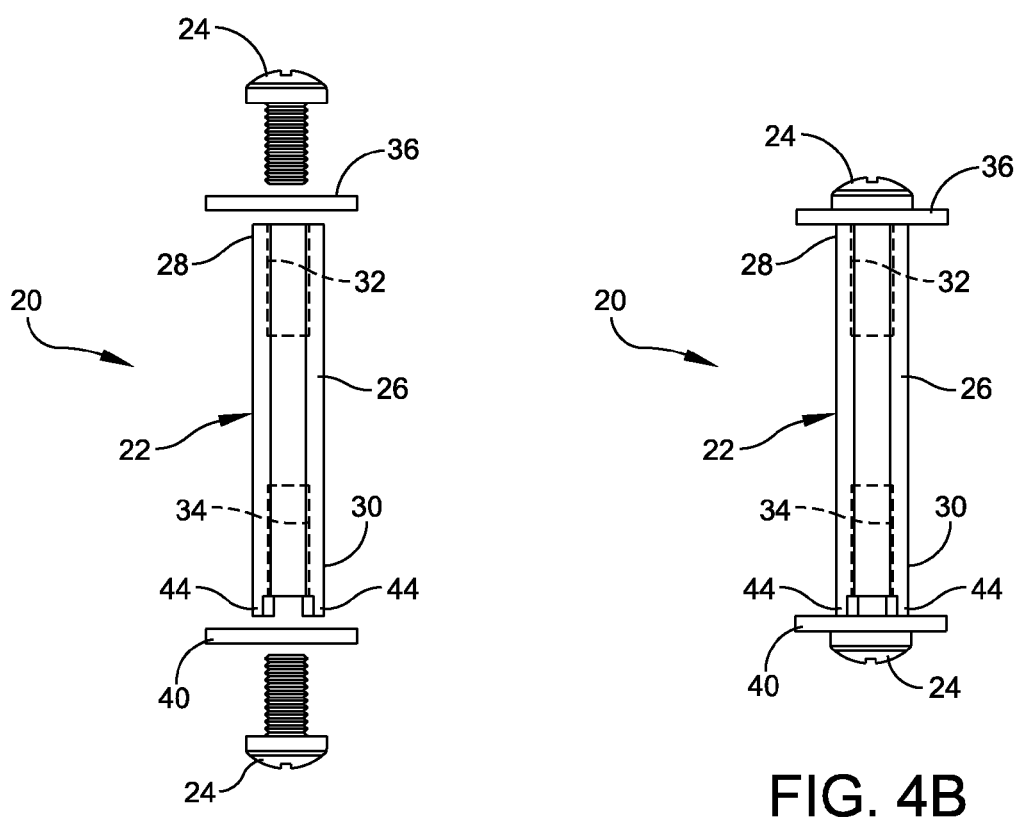
FIG. 4A is an exploded elevational view of the standoff assembly shown in FIG. 2.
FIG. 4B is an elevational view of the standoff assembly assembled with the first component and the second component.
Figure 5:
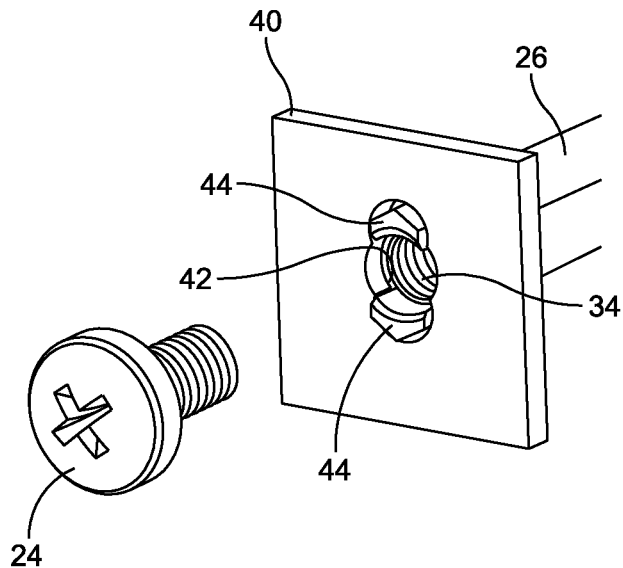
FIG. 5 is an exploded perspective view of a fastener used to secure one end of a standoff of the standoff assembly to the first component.

FIG. 4A illustrates the standoff assembly 20 prior to being assembled to the first and second components 36, 40. FIG. 4B illustrates the standoff assembly 20 after being assembled to the first and second components 36, 40. As shown, the first and second protrusions 44 of the anti-rotation structure each extend from the second end 30 of the body 26 of the standoff 22 a length that is substantially equivalent to a thickness of the second component 40, e.g., two mm. The lengths of the first and second protrusions 44 may be selected so that they correspond to or less than the thickness of the second component 40. As mentioned above, washers may also be provided. The standoff assembly 20 of the present disclosure enables the assembly of the first and second components 36, 40 without using tools that prevent standoff 22 from rotating during assembly or disassembly of the standoff assembly.

Figure 6:
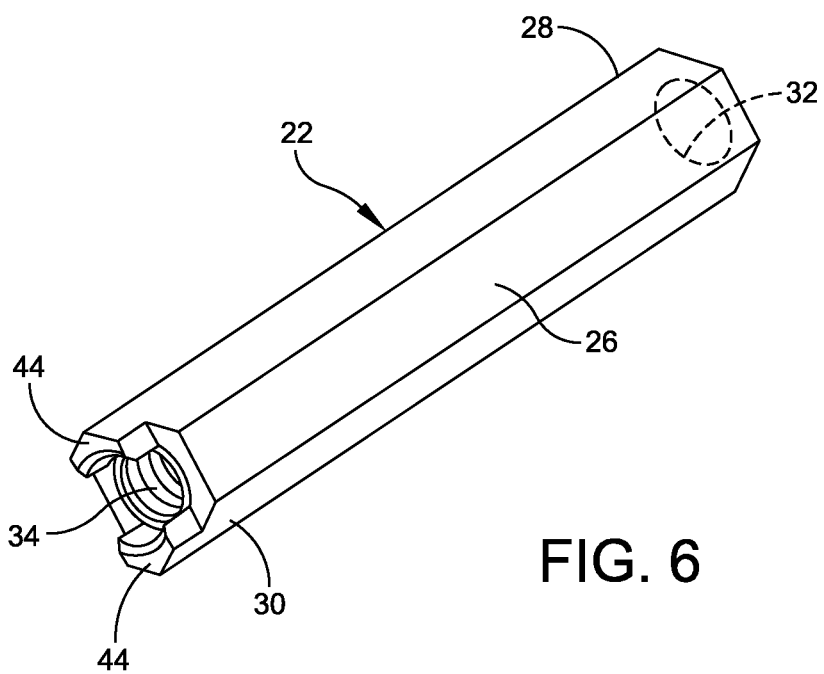
FIG. 6 is a perspective view of an end of the standoff of the standoff assembly.
Figure 7:
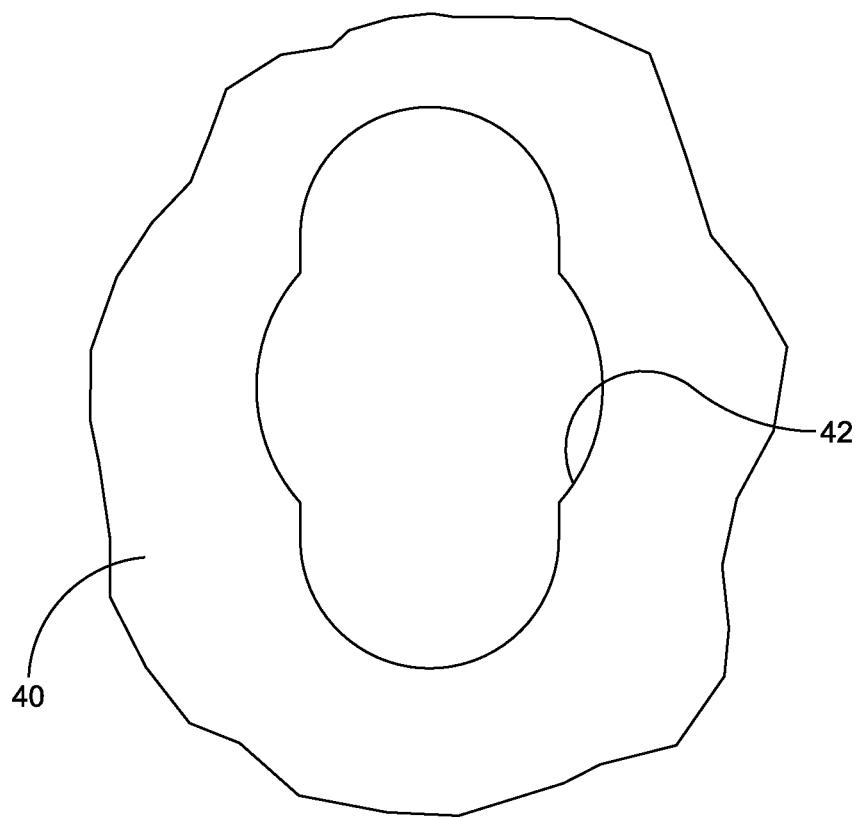
FIG. 7 is an enlarged plan view of an opening formed in the first component.

FIG. 6 illustrates the second end 30 of the standoff 22 having the anti-rotation structure. FIG. 7 illustrates the exemplary opening 42 formed in the second component 40 to receive the anti-rotation structure of the standoff 22 therein. In order for the standoff 22 to function as intended, the opening or slot 42 will receive the two protrusions 44 of the anti-rotation structure of the standoff. In one embodiment, the slot 42 is 7.4 mm in length, 3.4 mm in width, with rounded ends of the slot having a 1.7 mm radius. A center of the slot 42 will have a wider rounded area of 4.5 mm width with a radius of 2.25 mm. A narrower area of the slot 42 will work together with the two protrusions 44 of the standoff 22 to provide the anti-rotational function and a wider area of the slot will provide a clearance for the fastener 24 (e.g., a M4 size screw) that is used in assembly. The arrangement is such that as the protrusions 44 extend into the slot 42, the end 30 of the body 26 of the standoff 22 engages the second component 40 to provide the necessary engagement of the standoff with the second component.

During operation, a first component is separated from a second component by multiple standoff assemblies. In certain embodiments, the standoff assemblies may be provided at or near respective peripheries of the first and second components to achieve separation/insulation functions described above. As shown, the first component 36 and the second component 40 are planar structures. As discussed above, the components may be printed circuit boards and substrates. However, the components may be any structure requiring separation.

As described, the shapes and sizes of the standoffs, the protrusions formed on the standoffs, and the openings formed in the component may be varied to achieve the anti-rotational function described herein.

It is to be appreciated that embodiments of the devices and methods discussed herein are not limited in application to the details of construction and the arrangement of components set forth in the following description or illustrated in the accompanying drawings. The devices and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A standoff assembly for separating a first component from a second component from one another a predetermined distance, the standoff assembly comprising:

a standoff including a predetermined length defined between a first end and a second end, and an anti-rotational structure formed at the first end, the standoff being hexagonal in cross section along a length of the standoff, the anti-rotational structure being configured to be inserted into a corresponding opening formed in the first component;

a first fastener to secure the first component to the first end of the standoff; and a second fastener to secure the second component to the second end of the standoff, wherein the anti-rotational structure includes a first protrusion formed on one side of the threaded opening and a second protrusion formed on an opposite side of the threaded opening, the first protrusion being formed from two sides of the standoff and the second protrusion being formed from an opposing two sides of the standoff.

2. The standoff assembly of claim 1, wherein each end of the standoff has a threaded opening formed therein.

3. The standoff assembly of claim 2, wherein the first fastener and the second fastener each comprise a machine screw fastener.

4. The standoff assembly of claim 1, wherein the opening in the first component is shaped to receive the first protrusion and the second protrusion.

5. A method for separating a first component from a second component, the method comprising:

positioning a standoff between the first component and the second component, the standoff including a predetermined length defined between a first end and a second end, the standoff being hexagonal in cross section along a length of the standoff;

securing the first component to the first end of the standoff with a first fastener and the second component to the second end of the standoff with a second fastener; and preventing a rotation of the standoff with an anti-rotational structure formed at the first end of the standoff and inserted into a corresponding opening formed in the first component, wherein preventing the rotation of the standoff includes inserting the anti-rotational structure into a corresponding opening formed in the first component, the anti-rotational structure including a first protrusion formed on one side of the threaded opening and a second protrusion formed on an opposite side of the threaded opening, the first protrusion being formed from two sides of the standoff and the second protrusion being formed from an opposing two sides of the standoff.

6. The method of claim 1, wherein securing the first component to the first end of the standoff with the first fastener includes threadably securing a machine screw fastener within a threaded opening formed in the first end.

7. The method of claim 6, wherein securing the second component to the second end of the standoff with the second fastener includes threadably securing a machine screw fastener within a threaded opening formed in the second end.

8. The method of claim 7, wherein the opening in the first component is shaped to receive the first protrusion and the second protrusion.

* * * * *